United States Patent [19]

Smyk

[11] Patent Number: 5,751,961
[45] Date of Patent: May 12, 1998

[54] INTEGRATED INTERNET SYSTEM FOR TRANSLATING LOGICAL ADDRESSES OF INTERNET DOCUMENTS TO PHYSICAL ADDRESSES USING INTEGRATED SERVICE CONTROL POINT

[75] Inventor: Darek Andrew Smyk, Piscataway, N.J.

[73] Assignee: Bell Communications Research, Inc., Morristown, N.J.

[21] Appl. No.: 594,749

[22] Filed: Jan. 31, 1996

[51] Int. Cl.[6] .................................................. G06F 13/00
[52] U.S. Cl. ................................................... 395/200.47
[58] Field of Search ......................... 395/200.01, 200.02, 395/200.03, 200.09, 200.11, 200.16, 200.2, 200.3, 200.31, 200.47, 200.48, 200.57, 200.6; 370/401, 466, 474, 397; 379/219, 220; 348/13

[56] References Cited

U.S. PATENT DOCUMENTS

| | | | |
|---|---|---|---|
| 5,185,860 | 2/1993 | Wu | 395/200.54 |
| 5,341,477 | 8/1994 | Pitkin et al. | 395/200.33 |
| 5,426,637 | 6/1995 | Derby et al. | 370/401 |
| 5,557,748 | 9/1996 | Norris | 395/200.52 |

OTHER PUBLICATIONS

"Gateway Handles Thorny Problems with Addressing IP Networks", by Ellen Messmer, Network World, p. No. 8, Nov. 28, 1994.
"There's a Network Goin' Round Naming Names", by Baker, Steven, Unix Review, v10, n7, p. 21(6), Jul. 1992.
"Debugging a 3-Gbit/s Comm Switch", by Grove, Vince, Electronic Design, v42, n4, p.S27(2), Feb. 21, 1994.
Getting Started, Introduction to New Unix Review Column, by Morin, Richard, Unix Review, v11, n1, p.73(1), Jan. 1993.
"Workarounds Ease the IP Address Shortage", Data Communications, Feb. 1995, p. 33, vol. 24, No. 2.
"What's in a Name? The DNS Maps Symbolic Addresses into Deliverable Numeric IP Addresses", by Dutcher William, PC Week, Nov. 1993.
"Publishing on the Internet for Fun and Profit", by Dyson, Peter, Seybold Report on Desktop Publishing, v8, n8, p.3(12), Apr. 1994.
"Polymorphic Protocols", by Julitz, William, Dr. Dobb's Journal, v19, n1, p66(4), Jan. 1994.

*Primary Examiner*—Moustafa M. Meky
*Attorney, Agent, or Firm*—Joseph Giordano; Loria B. Yeadon

[57] ABSTRACT

An ISCP gateway connects an ISCP to the Internet. Internet call processing records ("CPRs") are generated and stored in a database associated with the ISCP. These Internet CPRs translate logical addresses in the URL standard to physical worldwide Web ("WWW") addresses in the URL standard. Hyperlinks Web documents are modified to include logical addresses. Browsers send requests containing logical addresses associated with hyperlinks to the ISCP gateway, which forwards the request to the ISCP. The ISCP executes a corresponding Internet CPR and returns a physical address to the Web browser. The Web browser then requests a document identified by the physical address in a normal fashion.

9 Claims, 3 Drawing Sheets

INTEGRATED INTERNET SYSTEM FOR TRANSLATING LOGICAL ADDRESSES OF INTERNET DOCUMENTS TO PHYSICAL ADDRESSES USING INTEGRATED SERVICE CONTROL POINT

CROSS REFERENCE TO RELATED APPLICATIONS

This application is related to U.S. patent application Ser. No. 07/934,240, entitled "System and Method for Creating, Transferring, and Monitoring Services in a Telecommunication System," filed Aug. 25, 1992, by Zaher A. Nazif et al., now abandoned; U.S. patent application Ser. No. 07/972,529, entitled "System and Method for Creating, Transferring, and Monitoring Services in a Telecommunication System," filed Nov. 6, 1992 by Zaher A. Nazif et al., now abandoned; and U.S. patent application Ser. No. 07/972,817, entitled "A Method of Creating a Telecommunication Service Specification," filed Nov. 6, 1992, by Susan K. K. Man et al., now U.S. Pat. No. 5,450,480, Sep. 12, 1992. The contents of these applications are incorporated by reference.

BACKGROUND OF THE INVENTION

The present invention relates generally to telecommunication networks and services and more specifically to Internet services.

The Internet presents significant challenges and opportunities to providers of traditional network services. The number of Internet users is growing exponentially, stimulating network service providers to create new services to capture this new market. Traditional providers of network services wishing to enter the Internet services market, however, face major challenges. The challenges result from the central paradigm of the Internet architecture, which involves the migration of functionality to the "peripheries of the network."

One successful and widely publicized portion of the Internet is the World Wide Web ("WWW"). At a conceptual level the WWW can be thought of as a vast, hyperlinked bank of data. To gain access to the WWW, a user must install on his/her computer WWW browser software and TCP/IP Internet protocol software and obtain a network connection from an Internet access provider. Once connected to the WWW, a user utilizes the browser to display "home pages"—graphical representations of information stored on WWW servers connected to the Internet. WWW pages include "hot links," which are usually represented by the browser as underlined text or special graphical elements. When a user viewing a page clicks on one of the "hot links," the browser retrieves from the WWW network a home page associated with the selected link. Linked pages may be retrieved from the same or different servers. The sources of linked pages are transparent to the user. Thus, when navigating links between WWW pages, a user gets an impression of dealing with a single, interconnected web of information.

As currently implemented in the WWW, each "hot link" included in a Web document is assigned an address called a Uniform Resource Locator ("URL"). The URL includes: 1) a protocol indicator; 2) the address of the Internet server on which a particular document resides (generally this address is specified as the Internet domain name of the host or the host Internet Protocol ("IP") address; and 3) the address of the document on the server (this address generally consists of a full file name, including a directory path, of the file which contains the document). For example, in URL: http://www.bellcore.com/aboutbell2.html, "http" identifies the protocol used between browsers and the web servers; "www.bellcore.com" corresponds to the address of Bellcore's (the present assignee) Web server; and "aboutbell2.html" identifies the document.

As described, URLs are in essence hard coded physical addresses of objects retrievable from the Internet. Hard coded physical addresses present several disadvantages and restrictions, however. One such disadvantage restricts document portability. Some web documents are pointed to by hundreds or thousands of other documents. If that pointed-to document is moved to another Web server or its location on the server is changed, the old pointers or links are incorrect. As a patch, one can put a temporary redirection document at the old address. This temporary document informs users that the original document has been moved and may include a "hot link" to the new location of the document.

Portability problems occur very often. For example, the home page for a very popular WWW search engine, YAHOO, was originally served from Stanford University's server under the URL: http://akebono.stanford.edu/yahoo/. When the YAHOO designers left Stanford, taking YAHOO with them, the YAHOO server's address had to be changed. The new URL to access YAHOO is http://www.yahoo.com/. Millions of Internet users accessing YAHOO using the old address, however, are currently served with a temporary redirection document informing them that the YAHOO address has changed. The YAHOO redirection document includes a note that the redirection document will be served only for a limited time, therefore, Web users are encouraged to modify their web links to include the new address. Relying on all Web links being updated is a particularly impractical and perhaps impossible task. When the Stanford server discontinues serving the redirection document, "hot links" to the outdated address will find nothing.

The WWW also faces overload problems. It is not uncommon that a single popular Web site cannot handle all user requests for documents stored at that site. Users trying to access documents from overloaded sites are informed by their browsers that the target site cannot serve their requests due to an overload. To support large communities of users, the information stored on popular Web sites can be replicated onto multiple or mirrored servers. Users experiencing problems with primary sites can try to connect to any of the mirrored sites by sequentially requesting connections to URLs of the mirrored sites—a particularly time-consuming, trial and error process. One example of this overload problem occurred recently at the popular Macintosh Archives at the University of Michigan with the following HRL: ftp://mac.archive.umich.edu/mac. The University of Michigan Macintosh archives are so popular and overloaded that at least twenty-five mirror sites have been established all over the world. Finding a mirrored site that is not too busy to serve a user requires users to try each of these twenty-five sites until one responds—a hit or miss process. This approach is time-consuming for users and imposes an extra burden on the network which must handle the connection attempts.

Recently, two methods have emerged to address problems associated with navigation between mirrored sites. The first method, implemented in Domain Name Servers ("DNS"), works as follows. Users request connection using a single URL which includes the domain name of the set of mirrored servers and a document path. The domain name is subsequently translated into the IP address of a server which is a member of the mirrored server set. The translation selects the members of the mirrored server set in a round robin fashion. For example, assume a mirrored server set has a domain of "mirror_servers," and the set includes two servers with IP addresses of 113.96.154.17 and 113.96.114.19, respectively. The first user who requests a document with a URL of http://mirror_servers/file_path will be redirected by the Domain Name Server to the URL: http://113.96.154.17/file_path_string. A subsequent user requesting a document with a URL of http: //mirror_servers/file_path will be automatically connected to the second server by redirecting him/her to URL: http:// 113.96.144.19/file_path_string.

This approach offers some benefits but also suffers several disadvantages. For example, this method of distributing traffic between members of the mirror set is limited to a round robin algorithm and will not support more advanced routing schemes such as time of day or day of week routing. Nor will this approach support uneven routing distribution (e.g. 20% of traffic to server 1 and 80% of traffic to server or dynamic traffic distribution based on server load.

This approach also limits server providers' control over placing the mirrored files. Assume, for example, that a service provider wishes to set up server 2 to mirror file "file_name" which resides on server 1 in a location identified by "file_path_string." The service provider must duplicate the "file_name" on server 2 and either place this file on server 2 in exactly the same location as on server 1 (identified by "file_path_string") or place the file in a different location and set up an alias which translates "file_path_string" to a new location. Thus, file placement is quite limited.

The second emerging method of supporting mirrored sites uses custom built applications attached to Web servers. These applications distribute traffic between mirrored sites according to the algorithm encoded in the application. This solution is usually web site specific and does not support general purpose scripting language for rapidly specifying distribution algorithms.

It is therefore desirable to provide an Internet system and service that substantially obviates one or more of the problems due to limitations and disadvantages of the related art.

It is also desirable to provide an Internet system with a more flexible addressing architecture and process for the WWW.

It is further desirable to provide a system and method for translating logical WWW browser addresses to physical addresses.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

DESCRIPTION OF THE INVENTION

To achieve these and other advantages and in accordance with the purposes of the invention, as embodied and broadly described, the invention includes an integrated Internet system, comprising one or more Internet documents having one or more logical addresses, means for displaying the one or more Internet documents, means, responsive to selections of the one or more logical addresses, for sending requests to an Integrated Service Control Point ("ISCP"), the ISCP including means to translate the one or more logical addresses to one or more physical addresses, and means for returning the one or more physical addresses to the display means.

In accordance with the purposes of the invention, as embodied and broadly described, the invention also includes a method of browsing documents on the worldwide Web, comprising the steps of selecting a first hyperlink address at a computer, sending a message including the first hyperlink address to an ISCP in response to the selecting step, translating the first hyperlink address into a second hyperlink address, and transmitting the second hyperlink address to the computer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the Drawings.

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers.

The following description of the preferred implementations of the present invention is only exemplary of the invention. The present invention is not limited to these implementations, but may be realized by other implementations.

Figure 1:
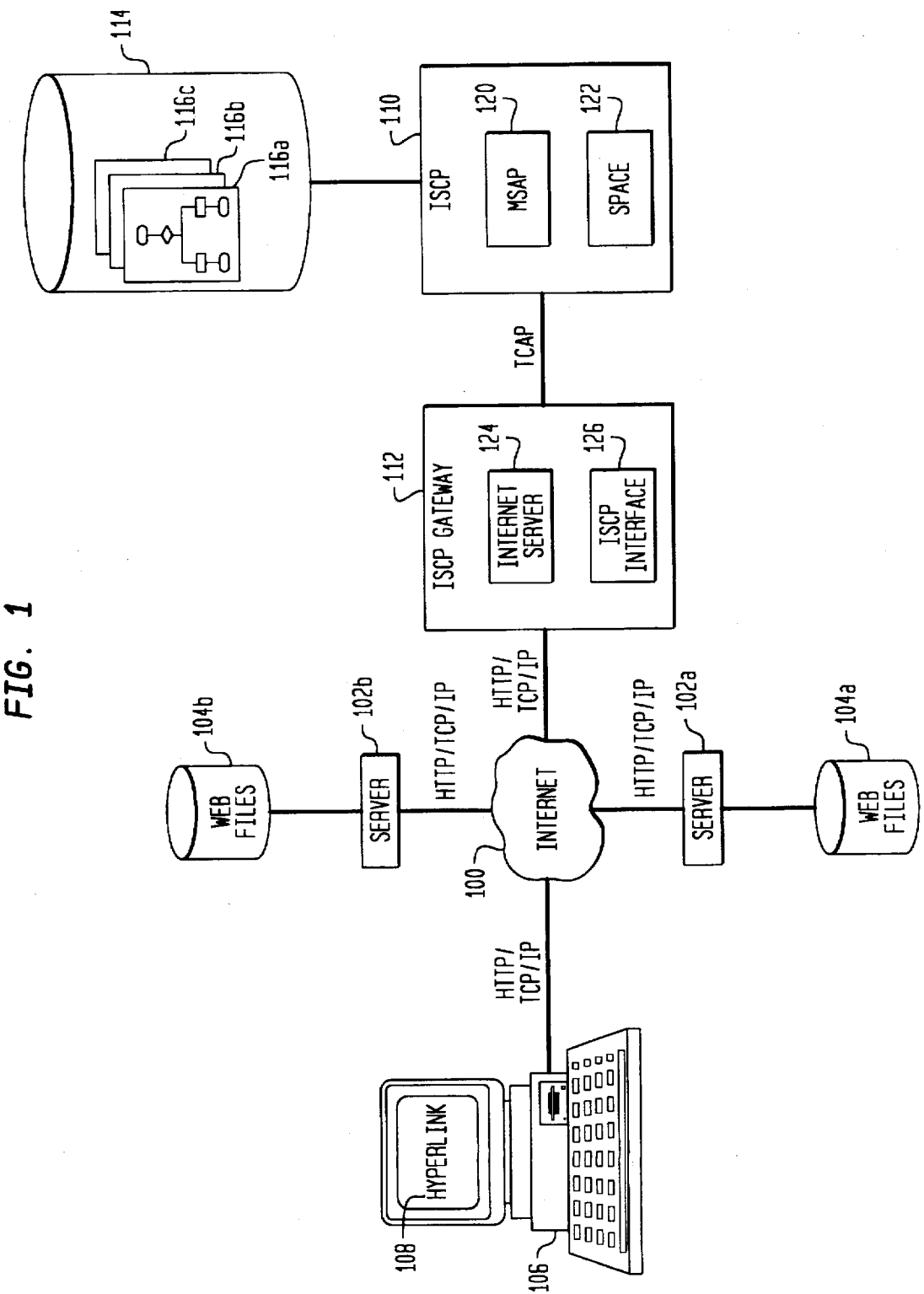
FIG. 1 is a block diagram of an integrated Internet system in accordance with one embodiment of the present invention.

FIG. 1 is a block diagram of an integrated Internet system in accordance with one embodiment of the present invention. As shown, the Internet 100 connects conventional Internet servers 102a and 102b and their corresponding file databases 104a and 104b, respectively. Servers 102a and 102b correspond to conventional Internet servers, such as Webstar from Quarterdeck Corp. or Netscape Communications Server from Netscape Communications Corp. Servers 102a and 102b communicate with the Internet via the HTTP/TCP/IP protocol. A user at a PC 106 can also connect to the Internet 100 via the HTTP/TCP/IP protocol. As described above, to communicate on the WWW, PC 106 must be running a Web browser application which supports hyperlinks 108 based retrieval of documents stored in Web files 104a and 104b any place on the Internet.

In accordance with a preferred embodiment of the present invention, an integrated service control point ("ISCP") 110 is also connected to the Internet via an ISCP gateway 112.

The ISCP gateway 112 communicates with the Internet via the HTTP/TCP/IP protocol. ISCP 110 preferably comprises a conventional ISCP running Bellcore's proprietary MSAP and SPACE applications. MSAP and SPACE are described, for example, in the incorporated applications cross-referenced at the beginning of this application. MSAP and SPACE have been successfully implemented in telephone network service control points ("SCP") to provide efficient telephone service creation and instantiation. The SPACE application generates call processing records ("CPR") and stores them in a database associated with the ISCP. Switches in the telephone network send queries (TCAP messages) to the ISCP and await call processing instructions. The MSAP application responds to the TCAP messages by executing CPRs corresponding to information provided in the TCAP message. The result of the execution of a CPR is a call processing instruction, which the ISCP then sends back to the switch to continue the call processing. This basic concept, in accordance with the present invention, is extended to provide logical addressing for the WWW.

In accordance with the present invention, hyperlink addresses 108 used in WWW browsers and WWW documents correspond to logical addresses, which cannot be used for IP routing until translated by the ISCP. Also, in accordance with the present invention, WWW browsers recognize logical hyperlink addresses and send all logical hyperlink addresses to the ISCP gateway 112. In one embodiment, CPRs 116a–116c are generated and executed to translate a logical hyperlink address to a physical Internet address. The Internet logical address CPRs 116a–116c are stored in a database 114 associated with the ISCP 110.

In accordance with the present invention, an ISCP gateway 112 is provided between the Internet 100 and the ISCP 110. The ISCP gateway 112 communicates with the Internet 110 via the HTTP/TCP/IP protocol and communicates with the ISCP 110 via the TCAP protocol or any other protocol supported by ISCP. Accordingly, ISCP gateway 112 includes an Internet server 124 and an ISCP interface 126 to provide these protocol interfaces. Namely, Internet server 124 responds to hyperlink logical addresses pointing to the ISCP 110 and translates these addresses into messages for the ISCP interface. The ISCP interface 126 translates these messages into TCAP messages which the MSAP 120 can recognize and respond to. In an alternative embodiment, the interface between the ISCP interface 126 and MSAP 120 is a modified TA-1129+ protocol or a general GDI protocol running on top of TCP/IP or any other protocol supported by ISCP.

It will be understood that, in accordance with the present invention, both conventional physical addresses and logical addresses can be used as hyperlinks, with the logical addresses being routed to the ISCP 110 and physical addresses being routed as usual. This translation of logical addresses to physical addresses is totally transparent to users who would continue to navigate the network by selecting "hot links" in WWW documents.

Figure 2:
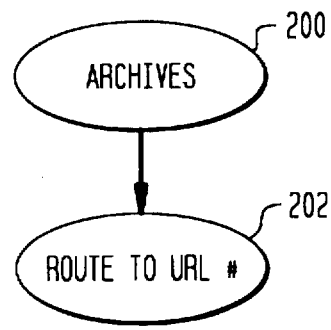
FIG. 2 is an example of an Internet call processing record ("CPR") in accordance with another embodiment of the present invention.

FIG. 2 shows an exemplary Internet CPR in accordance with one embodiment of the present invention. In its most basic form, an Internet CPR simply takes a logical address such as "archives" (step 200) and instructs the ISCP 110 to route that inquiry to a predetermined physical URL number (step 202).

Figure 3:
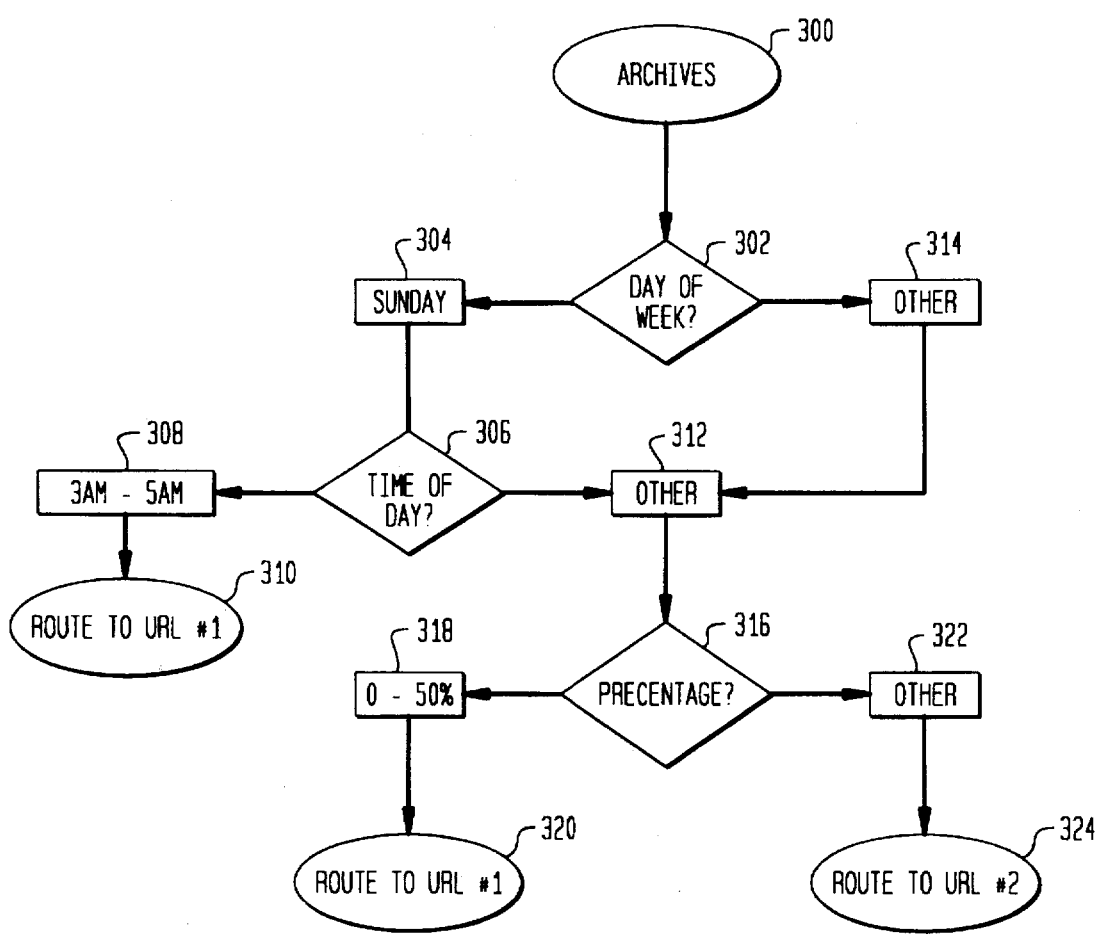
FIG. 3 is another example of an Internet CPR in accordance with another embodiment of the present invention.

FIG. 3 shows an exemplary Internet CPR in accordance with another embodiment of the present invention. This Internet CPR is more sophisticated than that of FIG. 2 and helps illustrate the significant flexibility of the present invention. Specifically, the Internet CPR of FIG. 3 provides access to mirrored sites/documents by distributing traffic between multiple mirrored sites depending on the day of the week, the time of the day, and a predetermined routing percentage.

Initially, the Internet CPR responds to a logical address "archives" (step 300) and determines the day of the week (step 302). If the day of the week is Sunday (step 304), the Internet CPR then determines the time of the day (step 306). Between the hours of 3:00 a.m. and 5:00 a.m. (step 308), the Internet CPR instructs the Web browser to route the logical address "archives" to URL 1 (step 310). For all other times of the day (step 312) and for all other days of the week (step 314), the Internet CPR distributes traffic to different mirrored sites depending on a preselected percentage (step 316). For example, 50% of the time (step 318), the Internet ISCP routes the logical address "archives" to URL 1 (step 320), and the other 50% of the time (step 322), it routes the logical address "archives" to URL 2 (step 324).

In an alternative embodiment, the Internet ISCP could distribute traffic based on the current loads of Internet servers. To implement this traffic distribution, the mirrored sites would periodically report their current loads to the ISCP 110, which would update the corresponding Internet CPR. In another embodiment, routing is based on the identity of the user requesting access to a particular logical address. For example, the user is required to enter an identification or PIN number, and routing distribution is then based on that identification number.

Thus, the present invention provides unique flexibility in routing WWW physical addresses. The Internet CPRs 116 are generated like any other CPR in Bellcore's incorporated applications and, therefore, provide unlimited flexibility.

A redirection command which includes translated physical URL addresses is sent back to the browser running on the PC 106 via the ISCP gateway 112 and Internet 100.

Figure 4:
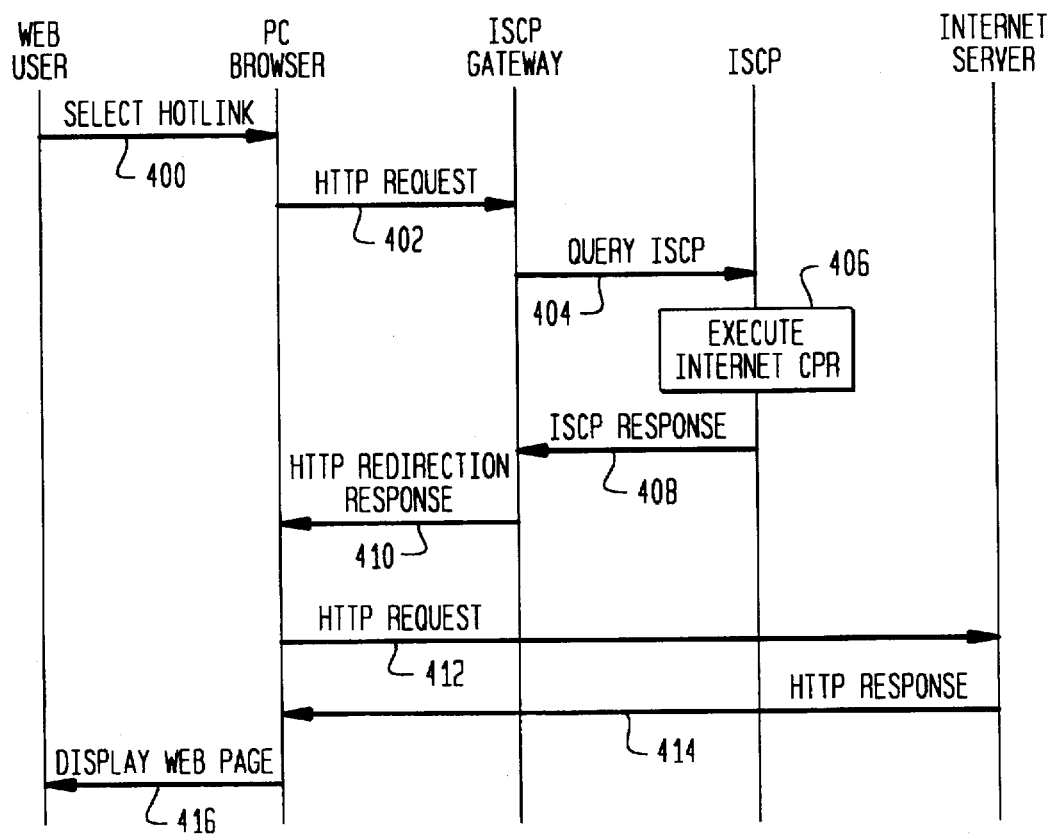
FIG. 4 is an example of flow process diagram for a logical address-based system in accordance with one embodiment of the present invention.

FIG. 4 illustrates a process flow diagram for processing logical addresses in accordance with one embodiment of the present invention. As shown, initially, a Web user selects a logical hot link on a PC (step 400). The PC browser responds to the selection by sending an http request to the ISCP gateway (step 402). The ISCP gateway sends an ISCP query to the ISCP (step 404). In response to the ISCP query, the ISCP executes an Internet CPR corresponding to the logical URL provided in the http request information (step 406). The resulting instructions containing a translated URL are sent back from the ISCP as an ISCP response to the ISCP gateway (step 408). The ISCP gateway then sends an http redirection response containing the translated URL to the PC browser (step 410). The PC browser responds by sending an http request to the Internet server corresponding to the address in the http message from the ISCP gateway (step 412). The Internet server, in a conventional manner, returns an http response message to the PC browser (step 414), which displays the Web document to the Web user (step 416).

The present invention allows owners of documents on the WWW to move between servers without the portability problems discussed above. When an owner of a home page wishes to change servers, the owner simply updates his/her Internet CPR 116 to route all selections of his/her logical address hyperlinks to a different physical address.

In addition, the present invention allows for implementation of logical "vanity" URLs, where a single home page could be assigned one or more logical address which is totally independent from the page's physical URL. For example, a home page containing information about a particular company could be assigned two logical addresses corresponding to the full and abbreviated names of the company, i.e., "Bellcore" and "BCR." The logical "vanity" URL can be much simpler and shorter than the physical URL which must exactly identify the home page location on the Internet. Thus, the use of logical "vanity" URLs may help Internet users remember, or even guess, the URLs of home pages that interest them.

As shown in the Figures, the ISCP gateway 112 preferably comprises two main software components: Internet Server 124 and ISCP Interface 126 (FIG. 1). The Internet Web server is a conventional Internet server, such as Netscape Communications Server or WebStar Server. Internet Server 124 interacts with clients' browsers utilizing HTTP protocol running over TCP/IP. ISCP Interface 126 interacts with Internet Server 124 using conventional methods of interfacing external software components to Internet Servers. For example, ISCP Interface 126 and Server 124 can interact through a Common Gateway Interface ("CGI") mechanism supported by most commercially available Internet servers. ISCP Interface 126 interacts with the ISCP 110 utilizing TA-1129+ general GDI protocol or any other suitable protocol supported by ISCP.

While there has been illustrated and described what are at best considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

I claim:

1. An integrated Internet system, comprising:

one or more Internet documents having one or more logical addresses;

means for displaying said one or more Internet documents;

means, responsive to selections of said one or more logical addresses, for sending requests to an Integrated Service Control Point ("ISCP");

said ISCP including means to translate said one or more logical addresses to one or more physical addresses; and means for returning said one or more physical addresses to said display means.

2. An integrated Internet system comprising:

a computer running a Web browser application;

Web documents having "hyperlinks" to logical addresses, said logical addresses corresponding to an Integrated Service Control Point ("ISCP");

said ISCP including:

a) a translating means, responsive to said logical addresses, for translating said logical addresses to physical addresses; and b) means for returning said physical addresses to said computer.

3. A system according to claim 2, wherein said ISCP translating means includes one or more Internet call processing records ("CPRs").

4. A system according to claim 2, wherein said ISCP includes a Multi-Services Application Platform ("MSAP").

5. A system according to claim 2, further comprising an ISCP gateway, comprising:

a) an Internet server; and b) an ISCP interface.

6. A system according to claim 5, wherein said Internet server interfaces to the Internet via a HTTP/TCP/IP protocol and interfaces to the ISCP interface via a common gateway interface.

7. A method of browsing documents on the worldwide Web, comprising the steps of:

selecting a logical hyperlink address at a computer;

sending a message including said logical hyperlink address to an ISCP in response to said selecting step;

translating said logical hyperlink address into a physical hyperlink address; and transmitting said physical hyperlink address to said computer.

8. The method of claim 7, further comprising the step of requesting a Web document from said physical hyperlink address.

9. An Internet call processing record, for execution by a processor, comprising:

processing instructions for responding to a logical Internet address;

processing instructions for translating said logical Internet address into a physical Internet address; and processing instructions for generating a routing instruction including said physical Internet address.

* * * * *